US008188624B2

(12) United States Patent
Noh et al.

(10) Patent No.: US 8,188,624 B2
(45) Date of Patent: May 29, 2012

(54) BRUSHLESS DC MOTOR FOR FUEL PUMP

(75) Inventors: Jongsang Noh, Ulsan (KR); Jonggeun Cha, Ulsan (KR); Jongman Lee, Yangsan-si (KR)

(73) Assignees: Donghee Industrial Co., Ltd., Ulsan (KR); DH Holdings Co., Ltd., Ulsan (KR)

( * ) Notice: Subject to any disclaimer, the term of this patent is extended or adjusted under 35 U.S.C. 154(b) by 322 days.

(21) Appl. No.: 12/610,024

(22) Filed: Oct. 30, 2009

(65) Prior Publication Data

US 2011/0080062 A1    Apr. 7, 2011

(30) Foreign Application Priority Data

Oct. 1, 2009    (KR) .................. 10-2009-0093841

(51) Int. Cl.
    *H02K 1/04*    (2006.01)
    *H02K 15/12*    (2006.01)
    *H02K 5/10*    (2006.01)
    *F04B 17/00*   (2006.01)
(52) U.S. Cl. ............ 310/43; 310/44; 310/87; 417/410.1
(58) Field of Classification Search .................... 310/43, 310/71, 114, 34, 115, 44, 87; 417/410.1
    See application file for complete search history.

(56) References Cited

U.S. PATENT DOCUMENTS

| 5,229,674 A * | 7/1993 | Best ................................ 310/71 |
| 6,305,900 B1 | 10/2001 | Yu |
| 7,215,052 B2 * | 5/2007 | Blase et al. ..................... 310/87 |
| 7,573,167 B2 * | 8/2009 | Miyamoto et al. ............. 310/99 |
| 2009/0189466 A1 * | 7/2009 | Dokas et al. ..................... 310/44 |

FOREIGN PATENT DOCUMENTS

| EP | 1783880 A2 | 5/2007 |
| JP | 2006-105042 A1 | 4/2006 |
| JP | 2009-033968 A1 | 2/2009 |

* cited by examiner

*Primary Examiner* — Quyen Leung
*Assistant Examiner* — Jose Gonzalez Quinones
(74) *Attorney, Agent, or Firm* — LRK Patent Law Firm

(57) ABSTRACT

The present invention is characterized in that it does not require specific fastening tools, which causes breakage or defects, or bonding work, because a brushless DC motor includes an insulator that is inserted in a stator to insulate a coil wound with led magnet wires and has at least one or more locking portions with locking grooves stepped on the inner side along the circumference and an outlet connector that has hooks fitted in the locking protrusions when being assembled with the insulator such that the insulator and the outlet connector are assembled in fitting and locking ways in assembling.

6 Claims, 5 Drawing Sheets

BRUSHLESS DC MOTOR FOR FUEL PUMP

BACKGROUND OF THE INVENTION

1. Field of the Invention

The present invention relates to a brushless DC motor, particularly a brushless DC motor used for a fuel pump.

2. Description of the Related Art

In general, a brushless DC motor, called a BLDC motor, is a type of motor where the mechanical contactors, such as a brush and a commutator, are replaced by a switching circuit using a semiconductor, such as a transistor, in order to improve the vulnerability, such as dust created by abrasion of the brush and limited life of the brush.

These BLDC motors are widely used in fields, such as motors for compressors of refrigerators or air-conditioners, and also used for wireless information devices requiring a simple structure, long life, small noise, and high reliability, such as a mobile phone, because they can easily control the speed and have high efficiency throughout the variable speed range.

However, it is another matter to apply the BLDC motors having the above advantages to a fuel pump for vehicles.

In order to apply the BLDC motor to a fuel pump requiring to be highly insulated, particularly it is necessary to ensure performance of an insulating portion that functions as an electric insulator between the stator of the BLDC motor and an outlet connector that functions as a cover housing of the stator.

The structural characteristic and corresponding works require using specific devices for fastening, and bonding, which causes additional processes and deteriorates productivity.

Even with acceptance of the above work, since it is difficult to apply an appropriate standardized reference to assembly of the insulating portion, the insulating portion may be broken by excessive force in screwing a bolt and the quality may be decreased, such as that the bonding portion is detached by an inappropriate amount of application for bonding work or narrowness between the rotator and the stator.

The high product defect ratio causes management for assembly, in accordance with the worker's skill and the environmental conditions, which makes it difficult to increase productivity and achieve an automated process, and as a result, it is difficult to apply BLDC motor to a fuel pump.

SUMMARY OF THE INVENTION

The present invention addresses the problem described above and it is an object of the present invention to provide a brushless DC motor that does not generate causes for adding processes or deteriorating productivity and reduce the manufacturing cost by reducing the machining and assembling processes, without requiring specific fastening tools or bonding work, by positioning an insulator, which is an electric insulator, between a stator with a coil wound and an outlet connector with a terminal, and fixing and assembling the insulator to the outlet connector in a locking way while insulating the stator with the insulator.

Further, it is another object of the present invention to provide a brushless DC motor that makes it possible to easily and stably connect magnet wires by leading the magnet wires led from a stator to an outlet connector and then fixing them to a terminal.

Further, it is another object of the present invention to provide a brushless DC motor that has improved productivity in manufacturing the motor without interfering with the flow of fluid in the motor by positioning an insulator, which is an electric insulator, to a stator with a coil wound and fixing and assembling the insulator to an outlet connector in a locking ways.

Further, it is another object of the present invention to provide a brushless DC motor that can be easily applied to a fuel pump of vehicles.

In order to accomplish the objects of the present invention, a brushless DC motor includes: an insulator that is combined with a stator to insulate a coil wound around a stator core of the stator and has at least one or more locking portions formed along the circumference; an outlet connector that has a terminal boss at a side where magnet wires led from the coil are positioned and the same number of hooks fitted and locked in the inner sides of the locking portions, when being combined with the insulator; and first, second, and third terminals that are positioneda at first, second, and third position holes making a pair on the terminal boss and have retaining ends where the ends of first, second, and third magnet wires led from the coil to be fitted in the first, second, and third position holes are positioned and spot-welded.

The locking portions protrude from the circumference and the hooks protrude from the inner sides of hook-formed steps depressed along the circumference to fit the locking portions.

The locking portion has a locking groove stepped inside on the inner surface and inclined sides chamfered at both sides where the locking groove is not formed, and the hook has an inverted triangular shape and is fitted in the locking groove such that the upper surface of the hook is restrained by the locking portion.

The locking portion and the hook, or the portions included to form the locking portion and hook are made from a raw material made by mixing polyacetal with glass fiber, which is an additive.

The stator includes a stator core having a cylindrical shape with the top and the bottom open, and a core body having a shape for assembling the stator core with the coil wound.

The insulator has a ring-shape insulating body that has a predetermined thickness and is inserted to surround the stator core and at least one or more locking portions that are integrally formed with the insulating body and protrude at a predetermined angle from each other, and the locking portion has a locking groove hollowed in a predetermined depth to be stepped on the inner surface.

The outlet connector includes a connector body having a ring shape, a hook flange stepped outside from the connector body to be fitted and fixed in the insulator inserted in the stator, inverted triangular-shape hook 24 formed to incline downward in at least one or more hook-formed steps hollowed along the circumference of the hook flange, and a terminal boss formed on the connector body.

The insulator and the outlet connector are manufactured from a raw material made by mixing polyacetal with glass fiber, which is an additive.

According to the present invention, since the insulator inserted in the stator with the coil wound is fixed and assembled to the outlet connector in a locking way, it is possible to reduce the manufacturing cost by reducing the machining and assembling processes while removing all the problems caused by using specific fastening tools or in bonding work.

Further, according to the present invention, since the assembly is achieved in a locking way without requiring specific fastening tools that are not standardized or bonding work, it is possible to basically prevent breakage or narrowness of parts by the fastening force in assembling and considerably improve the productivity by minimizing the components.

Further, according to the present invention, since the magnet wires are led from the stator to the outlet connector and then spot-welded to the terminal, it is possible to easily and stably connect the magnet wires and prevent contact point defects or separation of the magnet wires without interfering with the flow of fluid in the motor.

Further, according to the present invention, since assembly is easy and a complete insulation structure of a motor is implemented, it is possible to easily apply the motor to a fuel pump of vehicles.

DETAILED DESCRIPTION OF THE PREFERRED EMBODIMENTS

Embodiments of the present invention are described hereafter in detail with reference to the accompanying drawings and the embodiments are just exemplified and can be implemented by those skilled in the art, and the present invention is not limited to the embodiments described herein.

Figure 1:
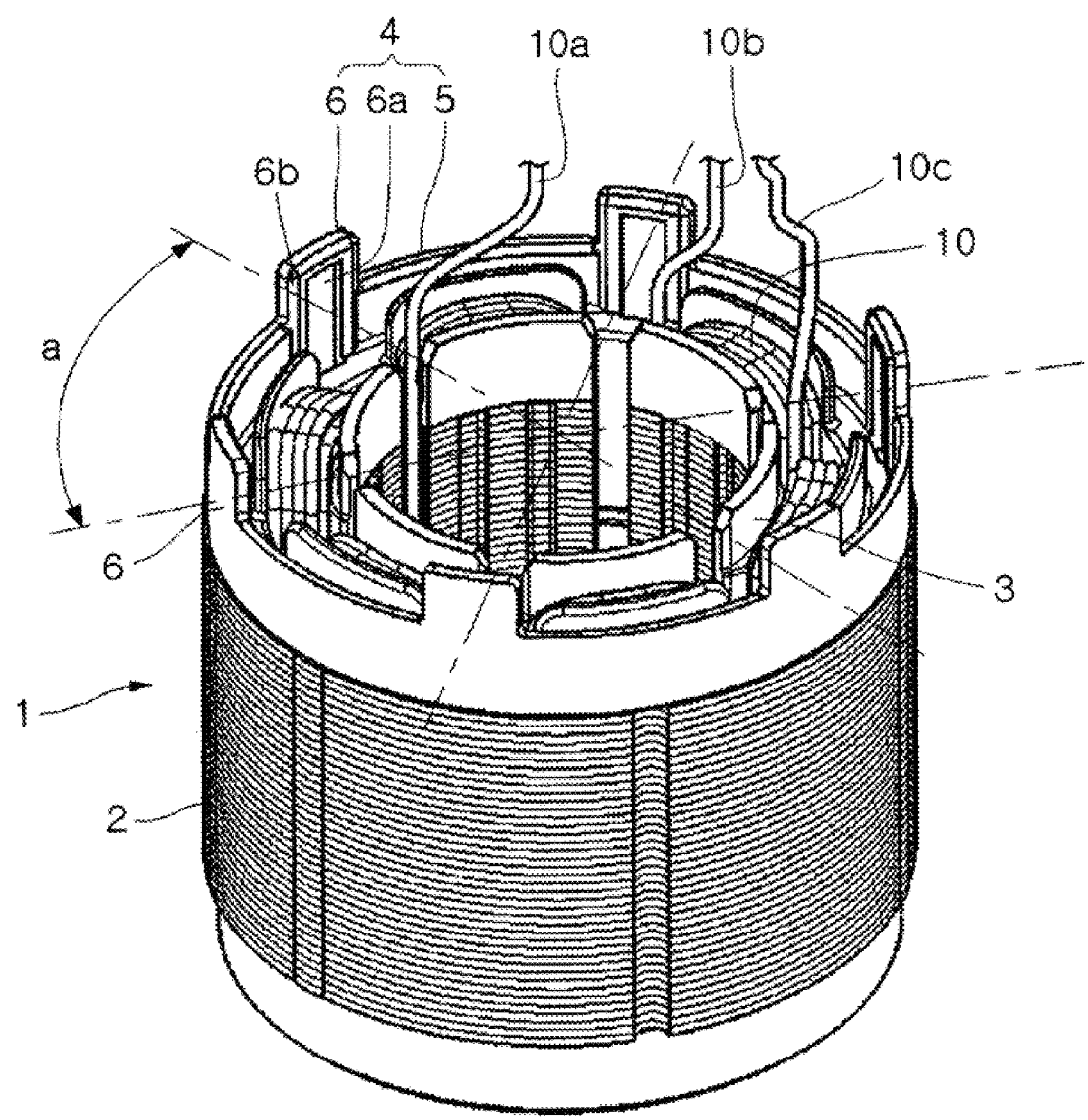
FIG. 1 is a perspective view showing a stator of a brushless DC motor according to the present invention.

FIG. 1 is a perspective view showing a stator of a brushless DC motor according to the present invention, in which a brushless DC motor of the present invention, a BLDC motor includes a stator 1 with a coil 10 wound, an insulator 4 inserted in the stator 1 for insulation, and an outlet connector 20 having a terminal 30 connected with magnet wires led from the coil 10 and locked and fixed to the insulator 4, such that it can be easily applied to a fuel pump for vehicles.

The stator 1 according to the present embodiment includes a stator core 2 having a cylindrical shape with the top and bottom open, and a core body 3 having a shape for assembling the stator core 2 with the coil 10 wound.

The stator core 2 is manufactured by pressing a silicon steel plate and has a single core plate structure or a thin core plate structure.

The stator cores 2 having the thin core plate structure are stacked in a plurality of stags and each of the stator cores 2 is stacked with insulation therebetween.

The insulator 4 according to the present embodiment insulates the coil 10 wound with magnet wires 10a, 10b, and 10c led, and for this configuration, the insulator 4 is inserted in the stator 1 to surround the stator core 2.

The insulator 4 has a ring-shape insulating body 5 that has a predetermined thickness and is inserted to surround the stator core 2 and locking portions 6 that are integrally formed with the insulating body 5 and protrude at a predetermined angle from each other.

In the present embodiment, the locking portions 6 are locked and fixed to the outlet connector 20 having the terminal 30 connected with the magnet wires 10a, 10b, and 10c led from the coil 10, such that it provides insulation to the stator 1 and an assembly structure without requiring specific fasters or bonding work.

The locking portion 6 has a locking groove 6a stepped to have a predetermined depth on the inner side and inclined sides 6b chamfered at both sides from the locking groove 6a on the inner side where locking groove 6a is not formed.

The locking portion 6 is at least one or more and it is preferable that a plurality of locking portions 6 are formed at a predetermined regular position angle (a) to provide stable fastening force.

In the present embodiment, six locking protrusions 6 are formed at a regular distance and the position angle (a) is 60°.

However, the number of locking portion 6 depends on the size of the stator 1.

In the present invention, the insulator 4 is manufactured by injection and the raw material is polyacetal+additive (Polyacetal+Glass Fiber 25%).

The polyacetal is also called polyoxymethylene or acetal resin having a chemical formula of ($-OCH_2-$), which has good fatigue resistance, strength, and abrasion resistance.

The present invention provides the insulator 4 having increased strength and rigidity and dimensional stability, by adding the additive (Glass Fiber) to the polyacetal having good fatigue resistance, strength, and abrasion resistance.

The coil 10 according to the present invention is wound around the stator core 2 of the stator 1, with the first, second, and third magnet wires 10a, 10b, and 10c led, and the first, second, and third magnet wires 10a, 10b, and 10c are connected respectively to the first, second, and third terminals 31, 32, and 33 of the outlet connector 20.

The coil 10 and the first, second, and third magnet wires 10a, 10b, and 10c are made of the same material and these are generally called magnet wires.

In the present embodiment, the outlet connector 20 is fitted in the insulator 4 inserted in the stator 1 and locked and fixed by hooks 24 that are locked to the locking portions 6, such that the outlet connector 20 is assembled to the stator 1 by the locking portion 6 and the hooks 24, without specific fasteners or bonding work.

Figure 2:
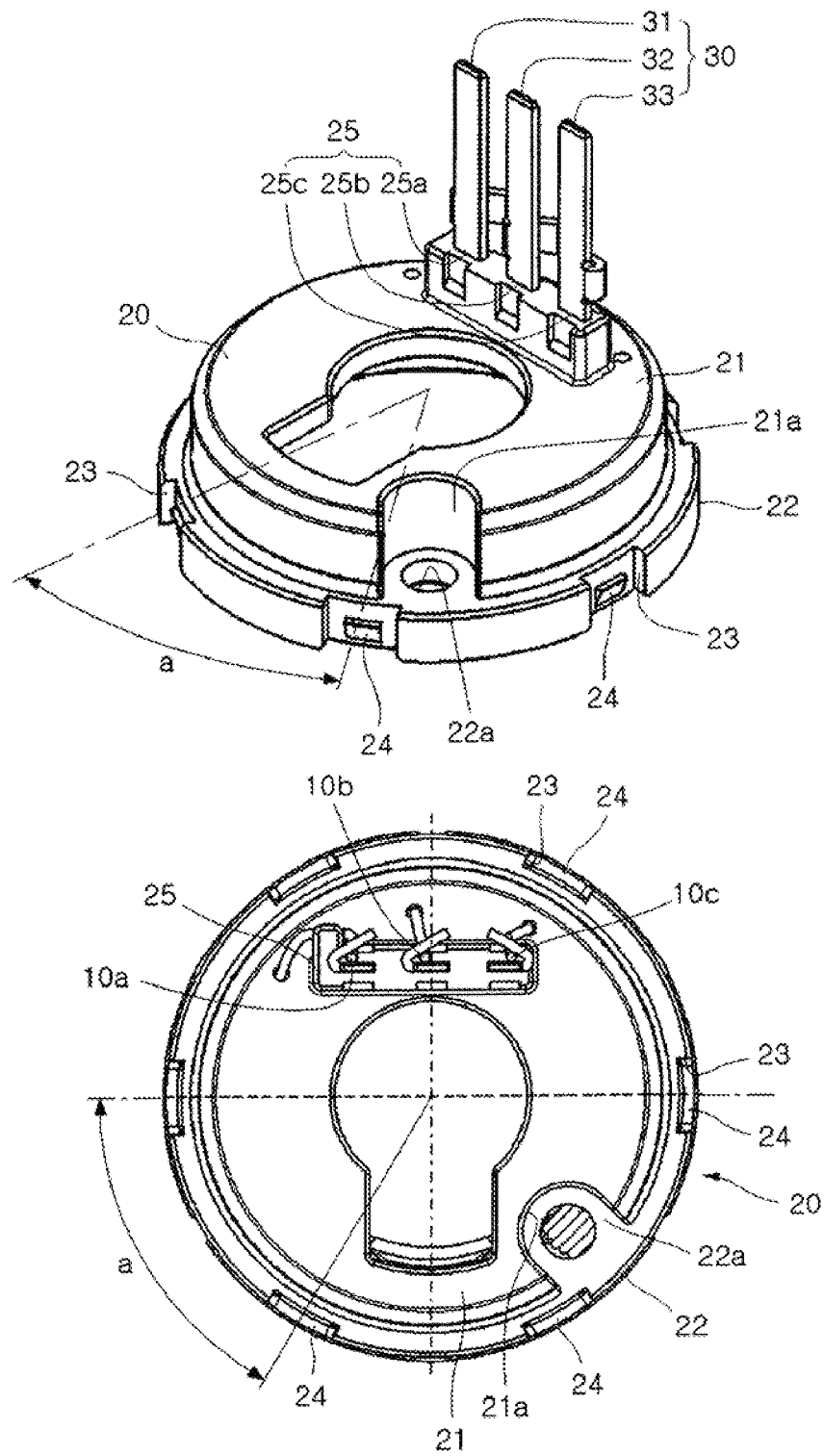
FIG. 2 is a perspective view showing an outlet connector of the brushless DC motor according to the present invention.

FIG. 2 is a perspective view showing an outlet connector of the brushless DC motor according to the present invention.

As shown in the figure, the outlet connector 20 is composed of a connector body 21 having a ring shape, a hook flange 22 stepped outside from the connector body 21 to be fitted and fixed in the insulator 4 inserted in the stator 1, and a terminal boss 25 formed on the connector body 21 to connect the magnet wires led from the coil 10 to the terminal.

A hook flange 22 has hook-formed steps 23 hollowed along the circumference and an inverted triangular-shape hook 24 is formed to incline downward in a hook-formed step 23.

The depth of the hook-formed step 23 is the same as the depth of the locking portion 6 and the width of the wide upper portion of the hook 24 is the same as the depth of the locking groove 6a of the locking portion 6.

In the present embodiment, the outlet connector 20 is manufactured from raw materials made of polyacetal+additive (Polyacetal+Glass Fiber 25%) by injection molding, or if needed, it is possible to make only the hook 24 from raw materials made of polyacetal+additive (Polyacetal+Glass Fiber 25%).

Hook 24 is at least one or more, preferably, a plurality of hooks 24 is formed at a predetermined regular position angle (a) to apply stable fastening force.

In the present embodiment, six hooks 24 are formed at a regular distance, and the position angle (a) is 60°.

However, the number of hooks 24 depends on the number of locking portions 6.

The terminal boss 25 has predetermined-shaped holes, where the magnet wires led from the coil 10 and the end of terminal 30 are inserted.

In the present embodiment, three magnet wires of first, second, and third magnet wires 10a, 10b, and 10c which make a pair are led from the coil 10 and terminal 30 is composed of first, second, and third terminals 31, 32, and 33, which make a pair.

As described above, since the three parts of the first, second, and third magnet wires 10a, 10b, and 10c and the first, second, and third terminals 31, 32, and 33 make a pair, respectively, the terminal boss 25 also has three holes of first, second, and third position holes 25a, 25b, and 25c, which make a pair.

In the present embodiment, one depressed portion 21a is formed at a predetermined position in the connector body 21 of the outlet connector 20, a protruding portion 22a of the hook flange 22 is positioned at the depressed portion 21a and a hole is further bored.

Figure 5:
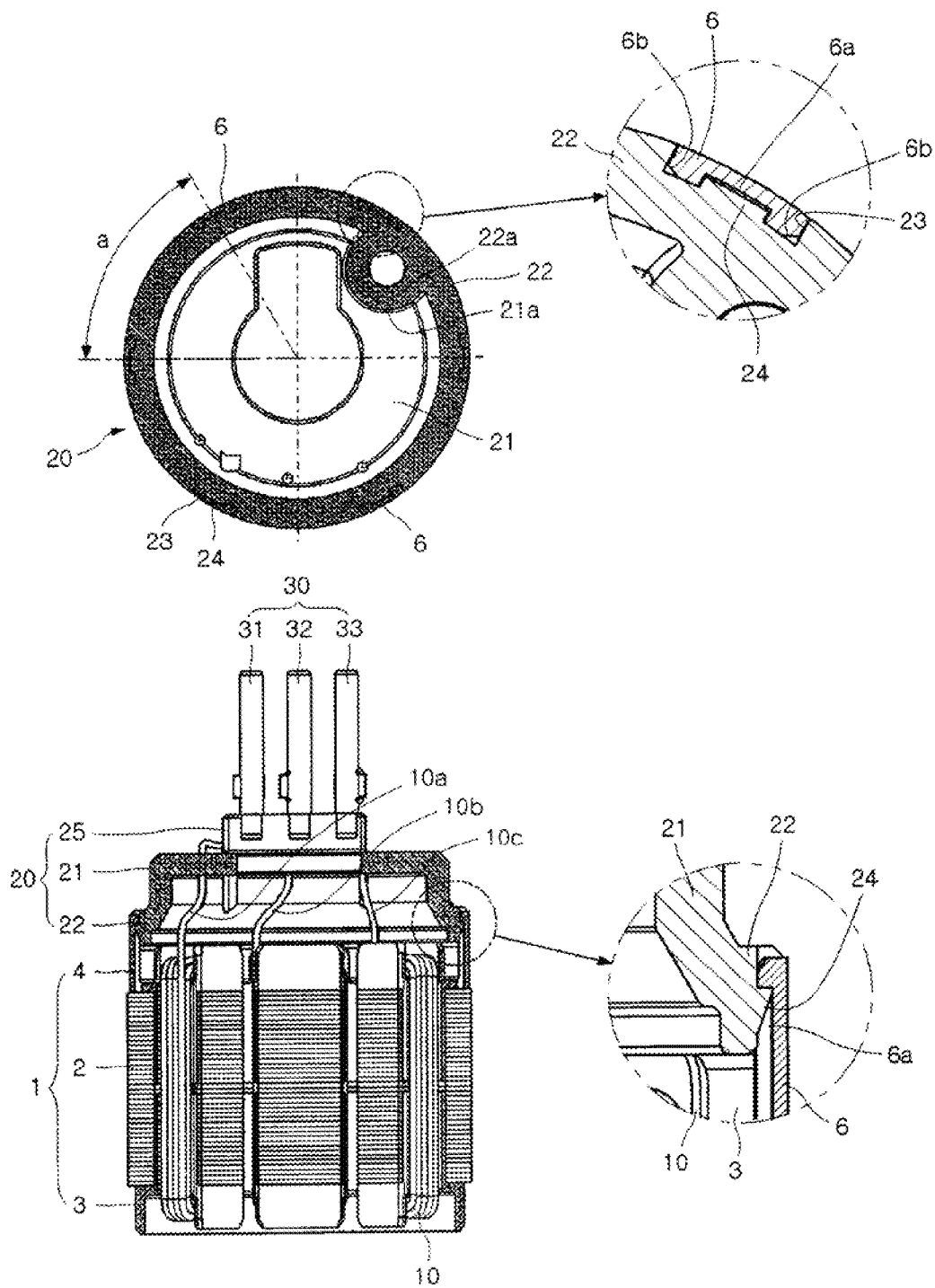
FIG. 5 is a cross-sectional view of the assembly of an insulator and the outlet connector according to the present invention.

According to the present embodiment, retaining ends 31a, 32a, and 33a are formed at the ends of first, second, and third terminals 31, 32, and 33 of the terminal 30 and the retaining ends 31a, 32a, and 33a hold and retain the first, second, and third magnet wires 10a, 10b, and 10c by spot welding (SW), as shown in FIG. 5.

As described above, the brushless DC motor according to the present embodiment has a structure that includes the insulator 4 inserted in the stator 1 and having at least one or more locking portions 6 with the locking grooves 6a on the inner sides along the circumference and the outlet connector 20 having the hooks 24 fitted in the locking portions 6 and locked and fixed thereto, in which the terminal boss 25 is formed on the outlet connector 20 to connect the first, second, and third magnet wires 10a, 10b, and 10c led from the coil 10 wound around the stator 1 to the first, second, and third terminals 31, 32, 33.

Figure 3:
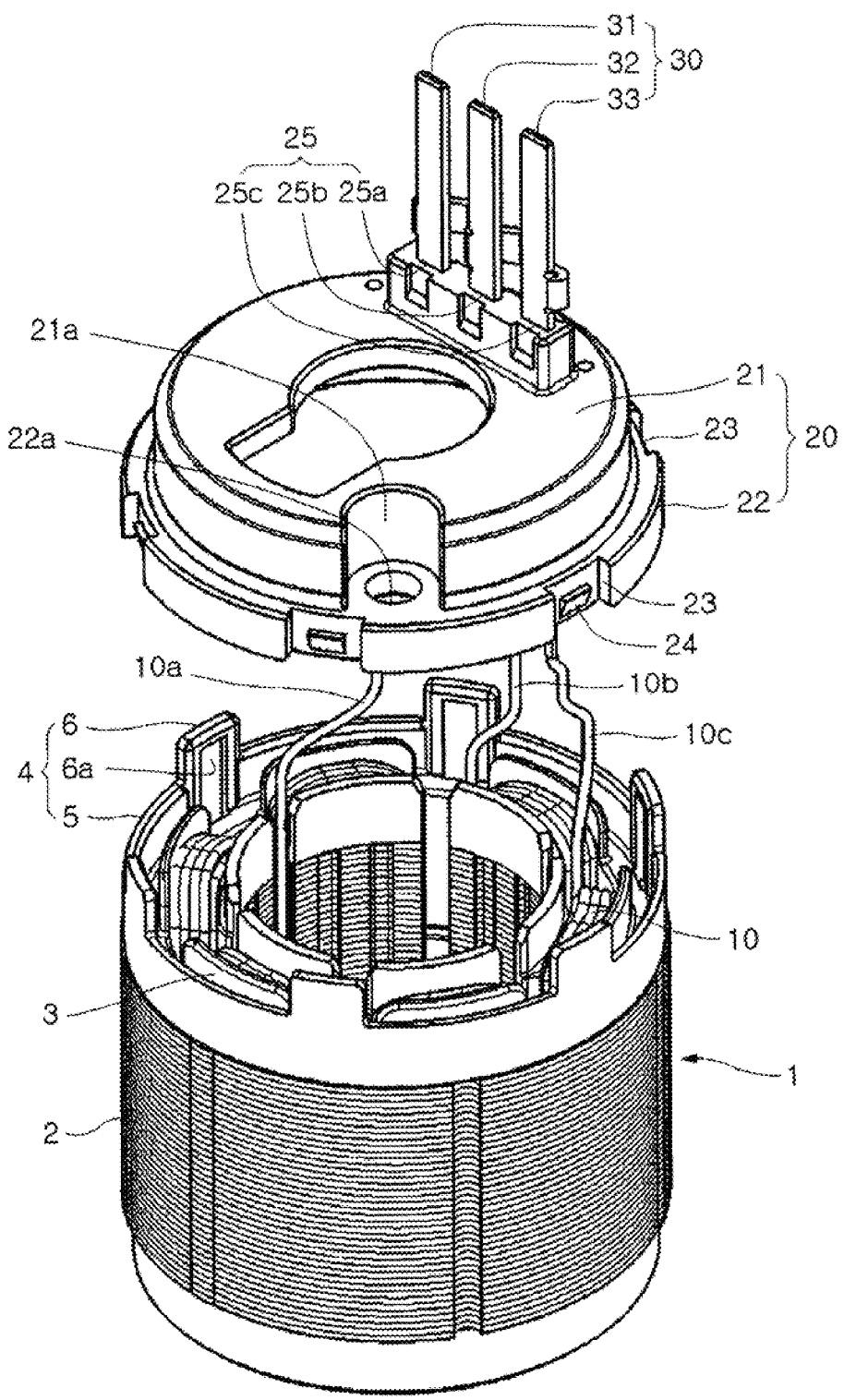
FIG. 3 is a perspective view illustrating when the stator and the outlet connector according to the present invention are assembled.

FIG. 3 illustrates that the stator 1, the insulator 4, and the outlet connector 20 are provided according to the present embodiment and the magnet wires 10a, 10b, and 10c led from the coil 10 are connected to the outlet connector 20.

As shown in the figure, in the stator 1, the insulator 4 is fitted in the stator core 2 to insulate the wound coil 10, and the first, second, and third magnet wires 10a, 10b, and 10c led from the coil 10 are led to the outlet connector 20 and then respectively connected to the first, second, and third terminals 31, 32, and 33 at the terminal boss 25 of the outlet connector 20.

Figure 4:
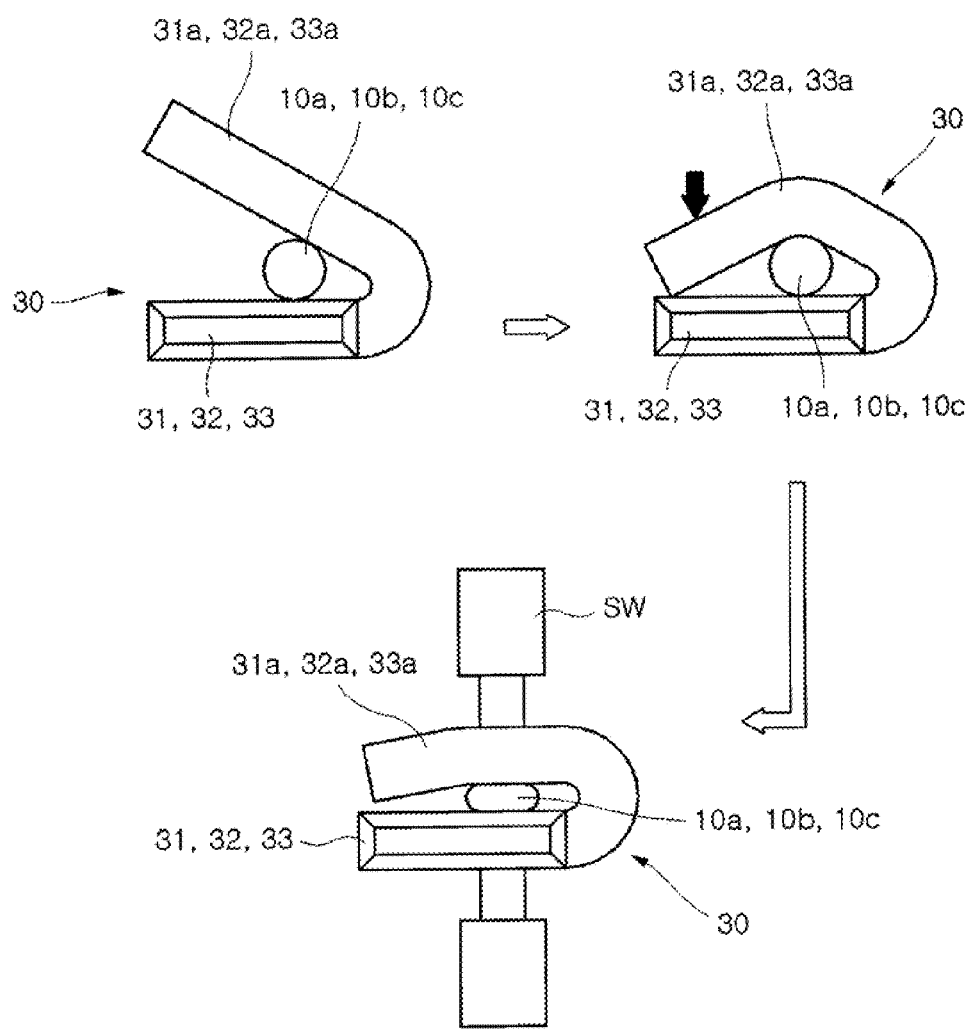
FIG. 4 is a view illustrating an operation of fixing terminals and magnet wires according to the present invention.

FIG. 4 is a view illustrating an operation of fixing the terminals and the magnet wires according to the present embodiments.

As shown in the figure, first, second, and third magnet wires 10a, 10b, and 10c are pressed and welded to first, second, and third terminals 31, 32, and 33, respectively.

Pressing is variously applied, but in the present embodiment, a method of forming the retaining ends 31a, 32a, and 33a at the first, second, and third terminals 31, 32, and 33, and pressing down the retaining ends 31a, 32a, and 33a with the first, second, and third magnets 10a, 10b, and 10c positioned inside, and then fixing them by spot welding.

In the present embodiment, since the terminal 30 is positioned at a side of the outlet connector 20, the magnet wires led from the coil 10 and connected to the terminal 30 are gathered in the inner side space, avoiding the center space of the outlet connector 20, which allows for simple wiring.

FIG. 5 is a cross-sectional view of the assembly of the insulator and the outlet connector according to the present embodiment.

As shown in the figure, the assembling and fixing operations can be simultaneously finished by positioning the locking portions 6 of the insulator 4 fitted in the stator 1 and the hooks 24 of the outlet connector 20 at the same position and then fitting the outlet connector 20 in the insulator 4.

That is, when the outlet connector 20 and the insulator 4 are assembled, the hook flange 22 of the outlet connector 20 is positioned on the insulating body 5 of the insulator 4 while the hooks 24 of the outlet connector 20 are locked to the locking portions 6 of the insulator 4, thereby generating locking force.

After the assembly is finished, since the maximum diameters of the insulator 4 and the outlet connector 20 are the same, as shown in the partially enlarged view of FIG. 5, smooth outer circumferential surface without protrusions is achieved.

After the assembly is finished, the locking portions 6 of the insulator 4 and the hooks 24 of the outlet connector 20 are locked to each other while maintaining the locking force, and the assembly state shown in the partially enlarged view of FIG. 5 is achieved.

As shown in the partial enlarged view of FIG. 5, when the hook-formed steps 23 formed around the hook flange 22 of the outlet connector 20 accommodate the locking portions 6 of the insulator 4, the hooks 24 protruding from the hook-formed steps 23 are positioned inside the locking grooves 6a of the locking portions 6.

In this assembly, the locking portions 6 are easily fitted in the hook-formed steps 23 by the inclined sides 6b chamfered at both sides.

After the hooks 24 are locked in the locking portions 6, as described above, the wide upper surfaces of the hooks 24 are in close contact with the upper surface of the locking grooves 6a of the locking portion 6, such that strong fixing force applied to the assembled outlet connector 20 is maintained.

That is, since the hooks 24 are positioned inside the locking portions 6, force for circumferentially fixing the outlet connector 20 to the insulator 4 is maintained against external shock, and since the upper portions of the hooks 24 are restrained by the locking portions 6, force for fixing upward the outlet connector 20 to the insulator 4 is also maintained against external shock.

What is claimed is:

1. A brushless DC motor comprising:
   an insulator that is combined with a stator to insulate a coil wound around a stator core of the stator and has at least one or more locking portions formed along the circumference;
   an outlet connector that has a terminal boss at a side where magnet wires led from the coil are positioned and the same number of hooks fitted and locked in the inner sides of the locking portions, when being combined with the insulator; and
   first, second, and third terminals that arc positioned at first, second, and third position holes making a pair on the terminal boss and have retaining ends where the ends of first, second, and third magnet wires led from the coil to be fitted in the first, second, and third position holes are positioned and spot-welded,
   wherein the locking portions protrude from the circumference and the hooks protrude from the inner sides of hook-formed steps depressed along the circumference to fit the locking portions, and
   wherein the locking portion has a locking groove stepped inside on the inner surface and inclinded sides chamfered at both sides where the locking groove is not formed, and the hook has an inverted triangular shape and is fitted in the locking groove such that the upper surface of the hook is restrained by the locking portion.

2. The brushless DC motor according to claim 1, wherein the locking portion and the hook, or the portions included to form the locking portion and hook are made from a raw material made by mixing polyacetal with glass fiber, which is an additive.

3. The brushless DC motor according to claim 1, wherein the stator includes a stator core having a cylindrical shape with the top and the bottom open, and a core body having a shape for assembling the stator core with the coil wound.

4. The brushless DC motor according to claim 1, wherein the insulator has a ring-shape insulating body that has a predetermined thickness and is inserted to surround the stator core and at least one or more locking portions that are integrally formed with the insulating body and protrude at a predetermined angle from each other, and the locking portion has a locking groove hollowed in a predetermined depth to be stepped on the inner surface.

5. The brushless DC motor according to claim 1, wherein the outlet connector includes a connector body having a ring shape, a hook flange stepped outside from the connector body to be fitted and fixed in the insulator inserted in the stator, an inverted triangular-shape hook formed to incline downward in at least one or more hook-formed steps hollowed along the circumference of the hook flange, and a terminal boss formed on the connector body.

6. The brushless DC motor according to claim 4, wherein the insulator and the outlet connector are manufactured from a raw material made by mixing polyacetal with glass fiber, which is an additive.

* * * * *